US010713658B1

(12) United States Patent
Medina, III et al.

(10) Patent No.: US 10,713,658 B1
(45) Date of Patent: *Jul. 14, 2020

(54) SYSTEMS AND METHODS FOR COUNTERFEIT CHECK DETECTION

(71) Applicant: United Services Automobile Association (USAA), San Antonio, TX (US)

(72) Inventors: Reynaldo Medina, III, San Antonio, TX (US); Nandhini Sridaran, Boerne, TX (US); Mario Gutierrez, San Antonio, TX (US); Robert G. Wood, San Antonio, TX (US); Adam Newman, San Antonio, TX (US); William Barfield, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,323

(22) Filed: Dec. 28, 2018

Related U.S. Application Data

(63) Continuation of application No. 15/707,122, filed on Sep. 18, 2017, now Pat. No. 10,210,522.

(60) Provisional application No. 62/396,556, filed on Sep. 19, 2016.

(51) Int. Cl.
| | |
|---|---|
| *G06Q 20/00* | (2012.01) |
| *G06Q 20/40* | (2012.01) |
| *G06K 9/20* | (2006.01) |
| *G06K 7/14* | (2006.01) |
| *G06K 9/00* | (2006.01) |
| *G06Q 20/04* | (2012.01) |

(52) U.S. Cl.
CPC ....... *G06Q 20/4016* (2013.01); *G06K 7/1413* (2013.01); *G06K 9/00181* (2013.01); *G06K 9/209* (2013.01); *G06Q 20/0425* (2013.01)

(58) Field of Classification Search
CPC .......... G06Q 20/4016; G06Q 20/0425; G06K 7/1413; G06K 9/00181; G06K 9/209
USPC ...................................................... 235/379
See application file for complete search history.

(56) References Cited

U.S. PATENT DOCUMENTS 10,210,522 B1 * 2/2019 Medina, III ......... G06K 7/1413

* cited by examiner

*Primary Examiner* — Daniel A Hess
(74) *Attorney, Agent, or Firm* — BakerHostetler

(57) ABSTRACT

Techniques for detecting counterfeit checks include using sensors to determine correspondence between a portion of sensed check information and related information; analyzing behavior related to accounts to a check deposit transaction; and controlling check depositing through user interface controls or communication. These techniques can be employed individually or in combination.

20 Claims, 9 Drawing Sheets

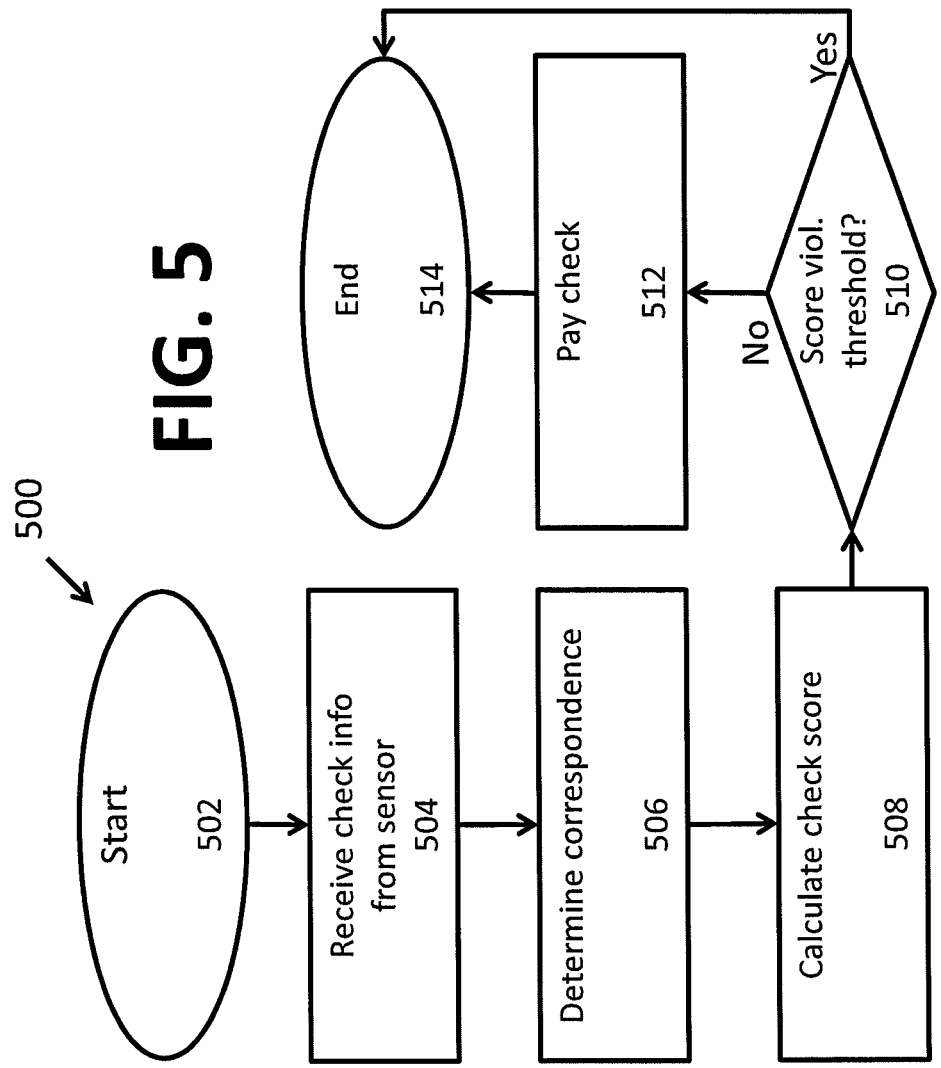

SYSTEMS AND METHODS FOR COUNTERFEIT CHECK DETECTION

CROSS-REFERENCE TO RELATED APPLICATION

This application is a continuation of and claims the benefit of U.S. application Ser. No. 15/707,122, filed Sep. 18, 2017 and claims priority to U.S. Provisional Patent Application No. 62/396,556, filed Sep. 19, 2016, the entirety of both which are incorporated herein by reference.

TECHNICAL FIELD

The technical field relates generally to detection of counterfeit or improper checks, and specifically avoiding deposit or honoring of counterfeit or improper checks.

BACKGROUND

Fraud is a huge issue costing financial institutions billions of dollars every year. Both to comply with regulation and in the interest of customer service and retention, it is often the financial institution, rather than the account owner, responsible for losses. Regardless of the responsible party, the losses frustrate confidence and introduce inefficiencies into the financial system.

Counterfeit checks are a particular type of fraud which can cost individual institutions millions of dollars every year. As with all physical documents possessing value, counterfeiters seek to make fraudulent checks then cash or deposit the checks to receive other money before the fraud is discovered.

The problem of counterfeit checks evolved with the emergence of electronic banking, which brought about remote check deposit using check images. With these and other electronic or online banking systems, customers expect quick access to deposited funds, which may be needed for other purchases. Therefore, the time until a check "clears" has decreased, and customers may be unwilling to wait for review of checks deposited using electronic banking before funds are made available. But this presents new hazards with electronically deposited checks and similar transactions. Because the check need not be presented to or examined by a human teller and processing algorithms may be understood by counterfeiters, techniques for defrauding early automated or remote check deposit systems were discovered and spread rapidly. With customers demanding funds be available faster than banks can detect fraud, existing systems are ripe for abuse by criminals.

SUMMARY

In an aspect, this disclosure is directed to non-transitory computer-readable medium, comprising instructions. When executed by a computer, the instructions cause the computer to receive at a check deposit infrastructure a data transmission including at least a portion of a check image representing a check for deposit using the check deposit infrastructure. The instructions also cause the computer to analyze the portion of the check image to identify at least a first item of check information, a second item of check information, and a check signature. The instructions also cause the computer to analyze the first item of check information and the second item of check information to determine item correspondence between the first item of check information and the second item of check information and compare the check signature to an account signature to determine signature correspondence between the check signature and the account signature. The instructions also cause the computer to determine a check score based on the item correspondence and the signature correspondence.

In another aspect, this disclosure is directed to non-transitory computer-readable medium, comprising instructions. When executed by a computer, the instructions cause the computer to receive at a check deposit infrastructure a data transmission including at least a portion of a check image representing a check for deposit using the check deposit infrastructure, analyze the portion of the check to identify an account associated with the check, determine a check writing toggle that check writing is disabled with respect to the account, and determine a check score based on the check writing toggle. In this instance, the check score can be determinative to rejecting the check.

In an additional aspect, this disclosure is directed to non-transitory computer-readable medium, comprising instructions. When executed by a computer, the instructions cause the computer to receive at a check deposit infrastructure a data transmission including at least a portion of a check image representing a check for deposit using the check deposit infrastructure, analyze the data transmission identify a payee of the check, analyze the portion of the check to identify an account associated with a drawer of the check, receive behavioral data related to the payee of the check and the drawer of the check, analyze the behavioral data to determine a behavior risk, and determine a check score based on the behavior risk.

BRIEF DESCRIPTION OF THE DRAWINGS

Aspects of the counterfeit check detection systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein.

FIG. 5 illustrates a flow chart of an example method for using machine vision to identify correspondence in a check image for deposit;

DETAILED DESCRIPTION

The present disclosure is directed to systems and methods for detecting and handling counterfeit checks. Techniques can include machine vision analysis, behavioral analysis, and controls realized through user interfaces and/or preferences.

It is to be appreciated the subject matter is described below more fully with reference to the accompanying drawings, in which illustrated examples are shown. The present disclosure is not limited in any way to the examples described below, as these examples can be implemented in various forms, as appreciated by one skilled in the art. Therefore, it is to be understood that any structural and functional details disclosed herein are not to be interpreted as limiting, but merely as a basis for the claims and as a representative for teaching one skilled in the art to implement, use, and test the disclosed technology. Furthermore, the terms and phrases used herein are not intended to be limiting but rather to provide an understandable description.

Unless defined otherwise, all technical and scientific terms used herein have the same meaning as commonly understood by one of ordinary skill in the art. Although any methods and materials similar or equivalent to those described herein can also be used, exemplary methods and materials are now described.

As used herein and in the appended claims, the singular forms "a," "an," and "the" include plural referents, unless the context clearly dictates otherwise. Thus, for example, reference to "an element" includes a plurality of such elements and reference to "the signal" includes reference to one or more signals and equivalents thereof as known to those skilled in the art, and so forth.

It is to be appreciated that certain implementations as discussed below may include software algorithms, programs or code residing on computer useable medium having control logic for enabling execution on a machine having a computer processor. The machine may include memory storage configured to provide output from execution of the computer algorithm or program. As used herein, the term "software" is meant to be synonymous with any code or program that can be in a processor of a host computer, regardless of whether the implementation is in hardware, firmware, or as a software computer product available on a disc, a memory storage device, or for download from a remote machine. The examples described herein include such software to implement the equations, relationships, and algorithms described above. Further, although at least one series of steps are presented as an example, it will be appreciated by those skilled in the art that the steps identified may be practiced in any order that is practicable, including, without limitation, the omission of one or more steps.

Figure 1:
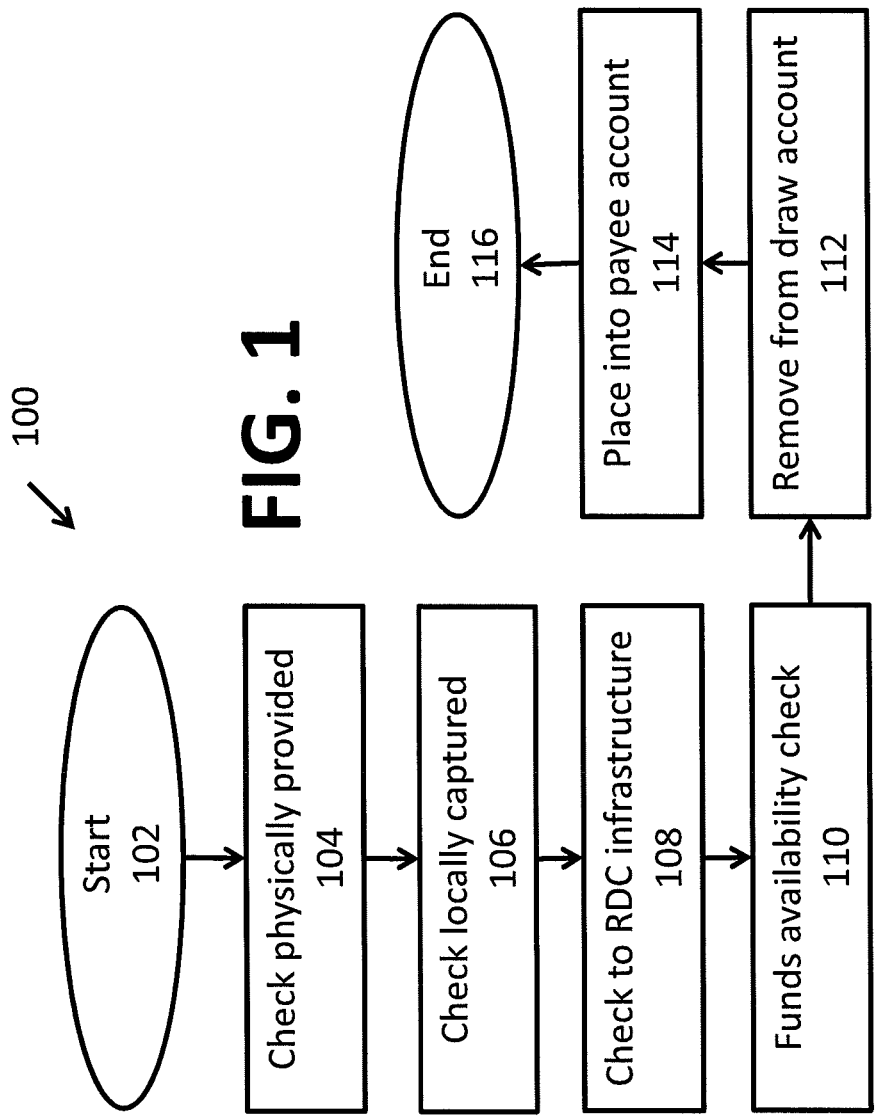
FIG. 1 depicts a flow chart of an example method of remote check deposit.

FIG. 1 depicts an example flow chart of a method 100 for electronic check depositing using remote deposit capture (RDC). Methodology 100 begins at 102 and proceeds to 104 where a check is physically provided. In this sense, the payee depositing the check receives the check and is free to deposit or otherwise redeem the check, and chooses to do so using RDC. At 106, the check is locally captured (using, e.g., a device including a camera and communication components for transmitting the data captured by the camera). At 108, the captured check is provided to RDC infrastructure using a transmission over a network. The RDC infrastructure is capable of performing tasks and managing accounts comparable to the manner in which paper check deposits would be handled, communicating debits and credits to respective institutions and ledgers. In this regard, a funds availability check can be conducted on the account on which the check is drawn (which may be an account on the institution controlling the RDC infrastructure or another institution) to determine that it is not a "bounced" check at 110. Assuming the account against which the check is drawn has funds available, the RDC infrastructure causes removal of the check's value from the drawer account at 112, which is credited to the payee account at 114. With this transaction complete, methodology 100 ends at 116.

Unfortunately, even with a funds availability check, significant fraud occurs, costing financial institutions, insurance companies, and their consumers millions annually. Fraudulent checks are frequently drawn against accounts with sufficient funds to cover the check values. Further, funds availability queries (or other techniques for showing legitimacy or worth) may not be possible with some types of checks such as business or government checks. In the RDC environment, these risks are amplified inasmuch prior as machine vision typically only looks for particular check elements to complete the transaction as opposed to appreciating the entire check to recognize irregularities bringing its authenticity into question. Many RDC infrastructures do not even determine if a check form was ever received, only whether certain pieces of information—account number, routing number, and amount—are retrievable without regard for whether this information even appears on anything resembling a check. Further, customer expectations of rapid funds availability after deposit and convenient, any-time account management have decreased the time available to institutions to validate checks before releasing funds.

Figure 2:
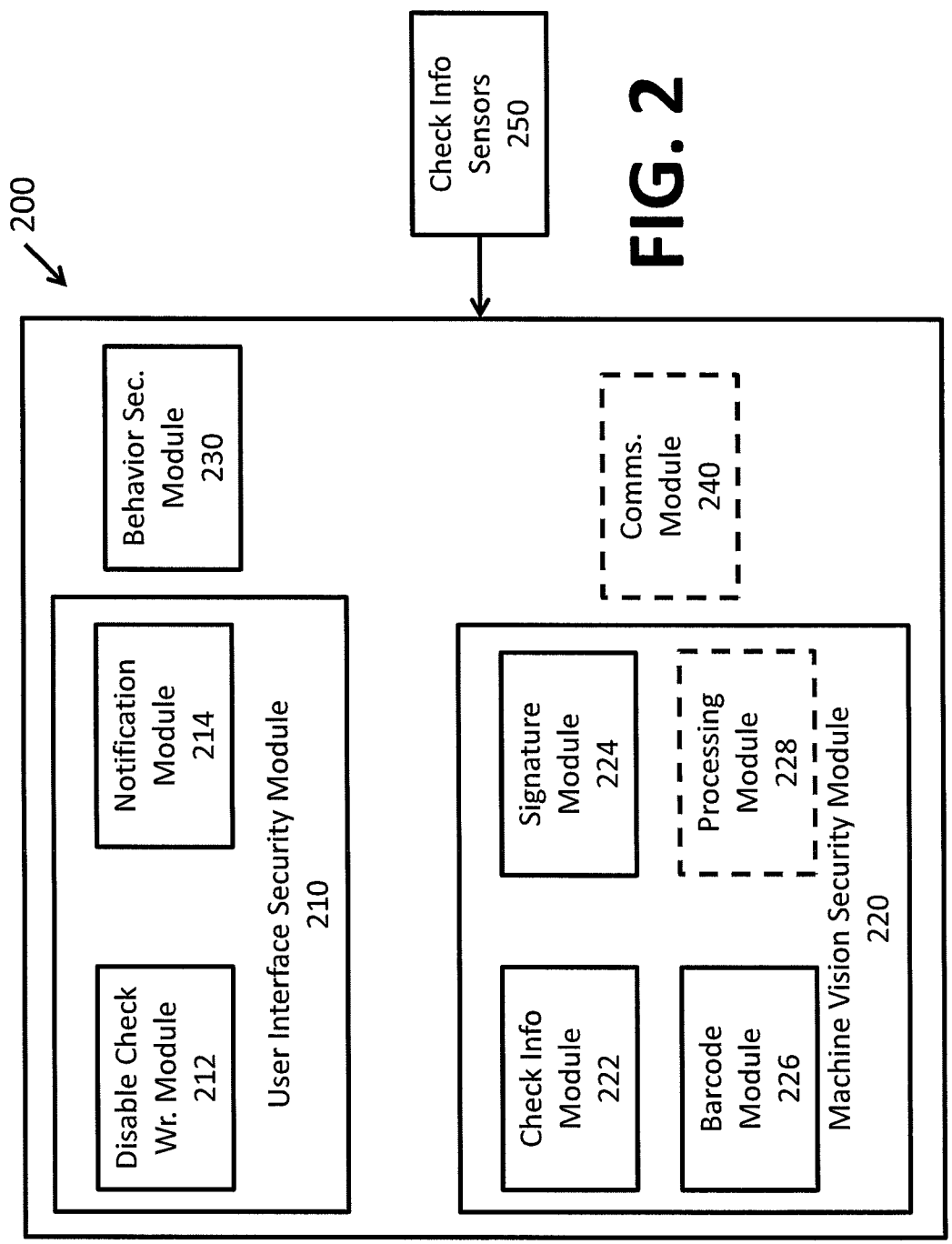
FIG. 2 depicts a block diagram of an example counterfeit check detection system.

FIG. 2 illustrates a counterfeit detection system 200 providing a solution to the hazards set forth above and other risks related to RDC. Counterfeit detection system 200 includes user interface security module 210, machine vision security module 220, and behavior security module 230. In embodiments, counterfeit detection system 200 also includes communications module 240. Counterfeit detection system 200 can be located at or within an RDC or at any other point or node accessible to the RDC via its network connections. Counterfeit detection system 200 also includes sensors 250 which can gather information about the check or its deposit context.

User interface security module 210 includes disable check writing module 212 and notification module 214. Disable check writing module is a module configured to disallow checks from being drawn against an account for which check writing is disabled. Disable check writing module 212 can be controlled remotely by the account owner using, e.g., a computer, tablet, or smart phone. Alternatively the user could write or call the financial institution to toggle disable check writing module 212. Disable check writing module 212 can include a database of accounts for which check writing is disabled (or otherwise controlled). Any check drawn against an account toggled to disable check writing using disable check writing module 212 will be rejected based on a query made during attempt RDC deposit. Disable check writing module 212 can be realized in a discrete or distributed fashion and can include a database listing accounts, a flag or parameter on individual accounts, and/or other stored data which is checked by disabled check writing module 212 when RDC causes a draw on an account.

In practice, counterfeit detection system 200 can receive data representing at least a portion of a check for deposit. This can be received using, e.g., communications module 240 and/or sensors 250. Thereafter counterfeit detection system 200 can analyze the check to determine an account against which the check is to be drawn has check writing disabled. Based on this determination, counterfeit detection system 200 can reject the check for deposit based on check writing being disabled for the account.

Notification module 214 can provide notifications to the drawer of the check alerting the drawer of the check for deposit being submitted via RDC. Notification module 214 can provide one or two way notifications based on an attempted check deposit. In embodiments, after a check image is received, notification module 214 can determine an account associated with the check based on analysis. The owner of the account can then be identified. Based on this identification, notification module 214 can transmit a notification (using, e.g., communications module 240 or other components) to the owner of the account alerting the owner of the check for deposit.

In a one way notification arrangement, the notification is provided to the owner of the account being drawn upon but clearing of the check is not dependent on response from the drawer. However, a delay may still be imposed, during which time the drawer may contact the institution to prevent payment.

In a two way notification arrangement, notification module 214 can be configured to process a negative response to the notification. The negative response to the communication can be sent from the notified owner of the account in response to the first notification. If a negative response is received, notification module 214 can reject the check for deposit based on the negative response. In embodiments the check may not be cleared until a positive response is given. In embodiments a timeout period may exist which clears the check if no negative response is given prior to expiration of the timeout period.

Machine vision security module 220 includes check information module 222, signature module 224, and barcode modules 226. In embodiments, machine vision security module can also include processing module 228. Machine vision security module 220 receives information representing at least a portion of a check for deposit using RDC.

Check information module 222 analyzes at least a portion of the check to determine the correctness of check layout and information, identifying issues with check information which may give rise to a suggestion of fraud. In an embodiment, check information module 222 analyzes a portion of a check image to identify at least first and second items of check information. The first and second items of check information can then be analyzed to determine correspondence between the first and second items of check information. Appropriate correspondence (e.g., different items of information locally present on face of check square with one another; information on check matches remotely accessible account details) suggests a properly-drawn check; a lack of correspondence suggests fraud. In embodiments, a single item of check information can be assessed. In alternative embodiments, three or more items of check information can be assessed.

Examples of items of check information can include, but are not limited to: routing transit number, routing fractional number, account number, drawer name, drawer address, bank (or institution) name, bank (or institution) address, check number, check date, check recipient, check amount, check memo, endorsements, security features (e.g., watermarks, microprint, borders, security screens, and others), barcodes (one or two dimensional) or other codes and symbols, check template or layout, et cetera. Payee name can also be determined as an item of check information. In embodiments, information associated with the check image can also be included, such as the origin of the image data in terms of an app or account used by the presumed payee to submit the check via RDC.

In a one item analysis, an item of check information may be located and analyzed for proper arrangement, content, or formatting. The presence of expected check features may be checked without interrogating them for consistency. In this manner, fraudulent documents omitting or improperly replicating standard check elements can be caught. For example, a check may be rejected if it is missing one of the aspects listed above (e.g., missing complete address); the bank name or watermark may be improperly recreated (misspelling, improper aspect ratio, et cetera); a barcode may be improperly formatted; and so forth.

Using a two (or more) item analysis, check information can be checked for consistency within the check or using stored information elsewhere. In an embodiment, first and second items of check information can be checked against one another for consistency. Examples of such information may be the check number from the corner and the check number from the account number line; the routing number and the bank name; and information extracted from a barcode or other code which includes aspects independently verifiable using only the face of the check.

One or more item analyses may also leverage information stored on a network to determine correspondence. For example, account information may be retrieved based on the account number, then compared to other information present on the check. In another example, account information may be used to confirm the name or address on the check. In an embodiment, check numbers can be compared for correspondence to other check numbers drawn from the account. In such embodiments, greater correspondence can be determined where check numbers are consecutive or "near" (e.g., within 10, within 100) numbers of checks previously drawn. Contrarily, less (or no) correspondence may be found where the check number is not "near" a previously deposited check number. Duplicate check numbers may also be identified (e.g., check number matches the number of a previously-deposited check), at which time they may be rejected or otherwise influence a check score. In another example, the check form, style, or template can be compared to a known check type or previously used check type(s), with matches increasing correspondence and mismatches decreasing correspondence. In embodiments, machine learning techniques can be used to adapt to changing account information, such as changing names or new check templates.

Signature module 224 analyzes at least a portion of the check image to identify a check signature. The check signature is compared to an account signature to determine a correspondence between the actual check signature and the stored account signature. The stored account signature may include a variety of possible verified signatures, or employ machine learning techniques to adaptively recognize changes to signatures based on time (e.g., signature changes over months, signature clearer during earlier hours), media (e.g., hard-copy ink signatures, electronic signatures with a stylus, electronic signatures with a finger), or other variables. Signature module 224 can determine whether anomalies are present in comparison to one or more verified signatures (or signature patterns developed through machine learning).

Barcode module 226 analyzes barcodes (or other symbols/codes) which may be present on the check image depending on the type of check. In embodiments, various governmental or institutional checks may include barcodes. In embodiments, the barcodes may be fully decodeable; in other embodiments, only portions of the barcodes may be decodeable. Where present, barcode module 226 can perform one or more types of analyses to assist with fraud detection.

In embodiments, barcode module 226 analyzes the barcode to determine barcode correspondence between the barcode and barcode information. Barcode information can be information on the face of the check which is encoded into the barcode (e.g., routing or account numbers, issuing institution) or stored in memory available to counterfeit detection system 200. This information can be analyzed for correspondence (e.g., matching between items on the face of the check and encoded barcode information, matching between known information stored in memory and information encoded in the barcode).

Alternatively, where a barcode is proprietary or its encoding is at least partially confidential, barcode module 226 analyzes the barcode to determine whether the barcode corresponds to other known barcodes in format (e.g., two dimensional, one dimensional, coding technique), length (e.g., amount of information), size (e.g., dimensions and aspect ratio), and other information which can be discerned without fully decoding the barcode. Where partial decoding is possible, such information can be compared or analyzed for correspondence with other information which is known or detectable. Further, as the barcode of each check deposited may be unique, the barcode may be stored for use in checking for duplication in future, possibly fraudulent checks.

Barcode module 226 can further be used in conjunction with proprietary or specially-designed barcodes. In embodiments, a financial institution involved with checking can dictate its instruments be marked with fraud-preventative barcodes which can be used by barcode module 226. These may apply to specific types of checks (e.g., Treasury checks) or all checks in general.

Machine vision security module 220 can also include processing module 228 in various embodiments. Processing module 228 can perform image processing to aid other modules or sub-modules in analysis. In embodiments, processing module can perform various aspects such as edge identification, cropping, binarizing, and filtering. In embodiments, a filter can be selected for readability. In embodiments, the filter can be selected based on detected or inferred lighting conditions. Processing module can accordingly standardize or enhance text, barcodes, signatures, or other portions of a check image.

Counterfeit detection system 200 also includes behavior security module 230. Behavior security module 230 can look at one or both of drawer or payee accounts and associated history/behavior to ascertain whether the check falls outside account behavioral patterns or within bounds suggesting fraud. In an embodiment, a portion of the check can be analyzed to determine a drawer. Behavior data related to the drawer of the check can be received, and thereafter behavior security module 230 can analyze behavioral data related to the drawer of the check. This analysis can produce a drawer behavior risk. The drawer behavior risk can be based on variables such as check amount, check timing, frequency of check writing by the drawer, frequency of check depositing by the drawer, et cetera. These variables can be analyzed in terms of the individual drawer's account history, as well as behavior trends or statistical analysis applied across the enterprise or groups of accounts therein. Account age (e.g., time open), balance, owner characteristics, or other variables can also factor into the determination of drawer behavior risk.

In alternative or complementary embodiments, the transmission to RDC can be analyzed to determine a payee of a check. This can include analysis of the transmission details to determine the origin and/or target account for deposit, as checks may not specify the account number for deposit, only for withdrawal, and so the payee will provide such information to the RDC to assist with the fund transfer. Determination of the payee can also include analysis of the check image. Once the check payee is identified, behavior security module 230 receives behavioral data related to the payee of the check. The behavioral data related to the payee of the check is analyzed to determine a payee behavior risk. The payee behavior risk can be based on variables such as check amount, check timing, frequency of check depositing by the payee, frequency of check drawing by the payee, et cetera. These variables can be reviewed in terms of the individual payee's account history, as well as behavior trends or statistical analysis applied across the enterprise or groups of accounts therein. Account age (e.g., time open), balance, owner characteristics, or other variables can also factor into the determination of payee behavior risk.

Once one or more of user interface, machine vision, and/or behavioral security aspects have been employed, counterfeit detection system 200 can determine a check score based on one or more of an item correspondence, a signature correspondence, and a behavior risk. The check score is compared to a threshold to determine whether the check should be paid. In embodiments, a check score initially exceeds the threshold, but is reduced based on confidence concerns as a result of the lack of correspondence or the presence of behavior risks. The check score violates the threshold by falling below the threshold. In alternative embodiments, a check score begins at zero (or another base number) and increases based on a lack of correspondence or the presence of behavior risks. The check score violates the threshold by exceeding the threshold.

Behavior risks can be scored in terms of addition (e.g., initial risk is zero and goes up), subtraction (e.g., initial risk is 100 and goes down), or other techniques. Behavior risks can influence a check score on a continuous scale (e.g., formula calculates exact impact to check score) or according to cutoffs (e.g., bands of behavior risk which have discrete impact on check score). Drawer and payee behavior risks can be considered in isolation, and/or considered together with equal or unequal weighting.

A reject flag can be placed, or a check score can be immediately set to violate a threshold based on determinative factors. Determinative factors can include that disable check writing module 212 returns that check writing is disabled for the account; notification module 214 employs two way notification and the response from the account owner indicates the check is fraudulent (or other stop-pay actions are taken); or if correspondence is so low as to guarantee fraud (such as when a partial check image is submitted fraudulently by persons knowing the limited information screened by legacy systems).

Various actions are taken based on the comparison of the check score to the threshold. In embodiments, if the check score violates the threshold, the check is rejected or held in full with a flag for review by the institution(s) associated with the drawer and/or payee. This prevents any funds from transferring fraudulently.

In embodiments, multiple thresholds can exist. One or more thresholds can relate to partial holds of the funds, releasing some but not all of the check's value for rapid availability (e.g., partial hold threshold(s)). Another threshold can relate to holding all funds or rejecting the check (e.g., rejection threshold). In an example, three checks may be deposited. The first predominantly corresponds as expected but the payee behavior risk is elevated because they have attempted to rapidly deposit a number of "on-us" checks via RDC from accounts with which they had no previous relationship. The second lacks correspondence and includes elevated behavior risk. The third corresponds and has no elevated behavior risk. In the first case, the check score may violate a partial hold threshold, and so only one quarter of the check value is released prior to additional review. Had the first check score violated a different partial hold threshold, more or less could be released. In embodiments, the amount released can be a portion of the check value, a maximum arbitrary value for all checks ($100, $500, et cetera) or based on the value of the check (e.g., not to exceed $1,000 for checks between $5,000 and $25,000). The second check violates the rejection threshold, and as such is not paid. The third check can be paid with all funds made immediately available, or funds made available according to rules generally applicable to checks of its type.

In an embodiment, a check type can be a Treasury Check or U.S. Postal Money Order identified by the routing number beginning with a leading "00." A finding of such type, as compared to other accounts, may modify check scoring or thresholds. This can be combined with other techniques, such as, e.g., using barcodes or other identifying marks in signature lines or in other portions of checks. In embodiments, a check design can be used to determine a check type or for a match. However, in alternative embodiments, customized checks (e.g., from various third party vendors) may be assessed only for specific information based on idiosyncratic designs.

In embodiments, notification module 214 can notify one or both of a drawer (or account owner, if fraudulent and the owner did not attempt to draw the check) and/or payee of a deposit attempt using RDC. This is distinct from earlier notifications used to indicate processing of payment and, in two way notification embodiments, await approval, inasmuch as this subsequent notification provides feedback as to whether the transaction was paid, held in part, or rejected.

In embodiments, electronic notifications can be provided when a service provider (e.g., handling notifications relating to a customer/client) receives information relating to a check deposit or check clearing at another institution (e.g., such as when the funds are requested for transfer but before they are paid). In this fashion, electronic capabilities associated with remote deposit capture can be leveraged in other environments to reduce fraud across all banking platforms.

Sensors 250 can include cameras configured to photograph, scan, or otherwise capture checks, pictures of parties depositing checks, or pictures of the environment around a deposit. Images can be collected or processed in various spectrums or with various lighting or filters applied. Sensors 250 can include other sensors such as microphones, location or motion sensors, chemical or material sensors, et cetera. While sensors 250 are shown as an element of counterfeit detection system 200, various implementations are possible. Sensors 250 can be included in counterfeit detection system 200, or counterfeit detection system 200 can comprise a counterfeit detection engine that receives sensor data remotely (e.g., from a user or member device such as a cellular phone including an RDC app).

While counterfeit detection system 200 is shown as including all of the modules described above, it is understood that alternative embodiments may exclude one or more of the modules shown, and modules may be individually implemented or implemented with other components in alternative systems, without departing from the scope or spirit of the innovation. In an embodiment, one or more modules of counterfeit detection system 200, or all of counterfeit detection system 200, can be integrated with an institutional Transaction Risk Assessment (TRA) system.

Figure 3B:
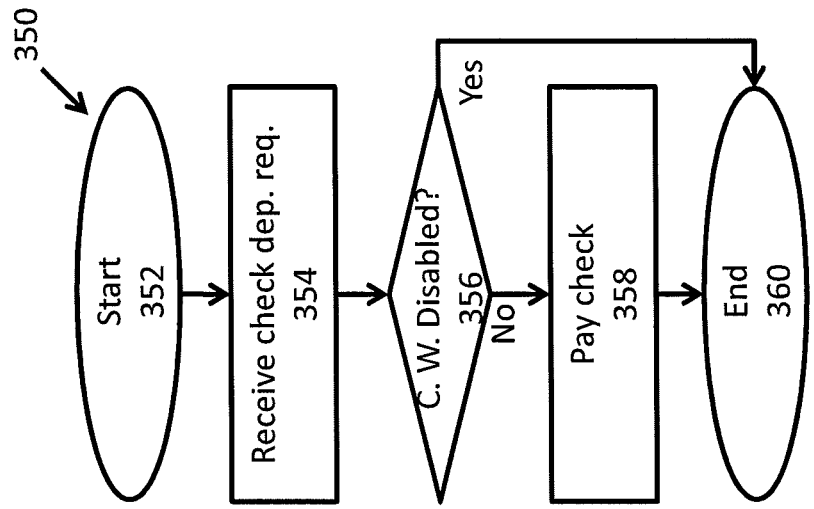
FIGS. 3A and 3B depict flow charts of example methods for enabling or disabling check writing with respect to an account.
Figure 3A:
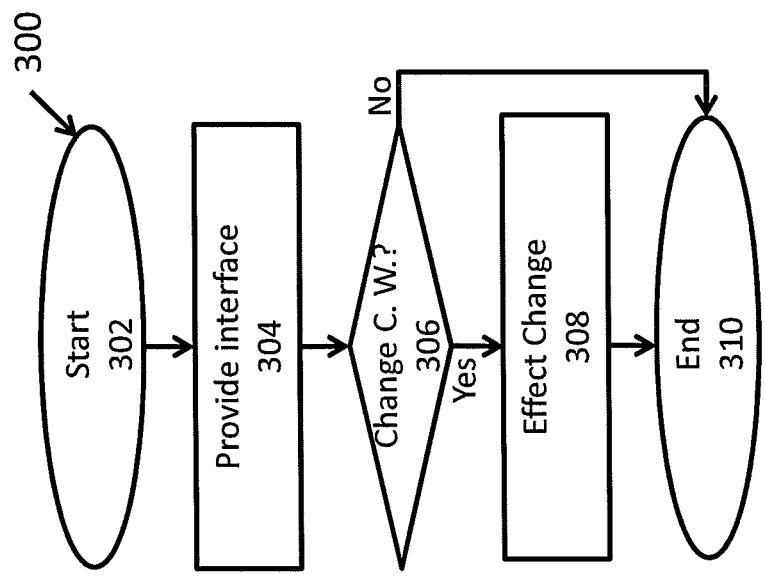

FIGS. 3A and 3B illustrate methodologies 300 and 350 related to enabling and disabling check writing with respect to an account. In particular, FIG. 3A illustrates methodology 300 for enabling or disabling check writing. Methodology 300 begins at 302 and proceeds to 304 where an interface is provided to an authorized account user. The interface can be an application, website, voice interface, or other alternative. At 306, a determination is made as to whether a change is being made to check writing on the account. This change can be to disable check writing on an account for which check writing was previously enabled, or to enable check writing on an account for which check writing was previously disabled. This change may also, in embodiments, enable or disable two way notifications or other notifications/approvals with relation to check deposits. If a change is to be made, the change is effected at 308. Thereafter, or if no changes are made, methodology 300 ends at 310.

FIG. 3B illustrates a methodology 350 for controlling check payments for accounts on which users can disable or enable check writing. Methodology 350 begins at 352 and proceeds to 354 where a request to deposit a check (e.g., via RDC) is received. Thereafter, a determination is made at 356 to determine whether check writing is disabled with respect to the account from which the check is to be drawn. If the determination made at 356 returns negative, methodology 300 proceeds to 358 where the check is paid. Thereafter, or after 356 if the determination returns in the positive, methodology 350 ends at 360.

Figure 4B:
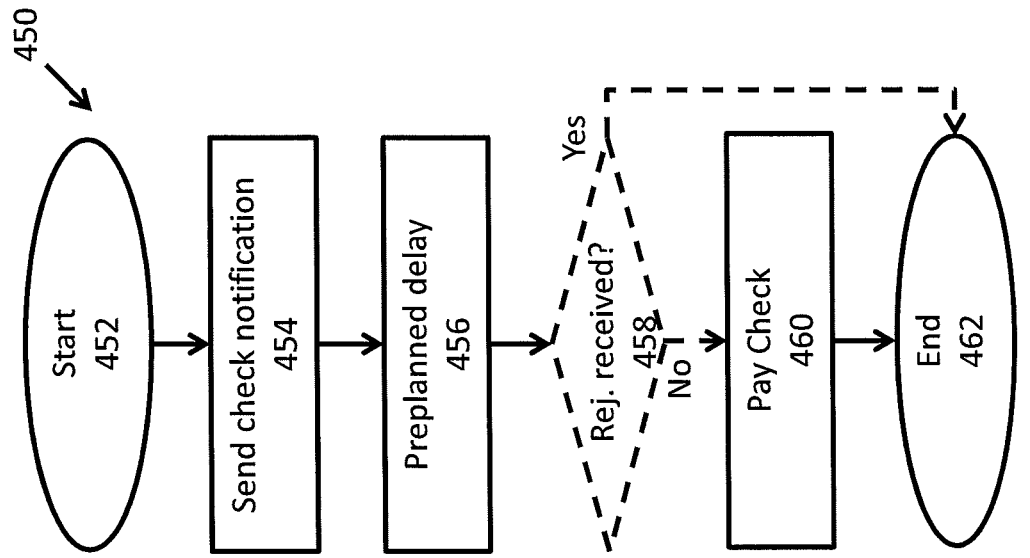
FIGS. 4A and 4B depict flow charts of example methods for using notifications with respect to check deposits.
Figure 4A:
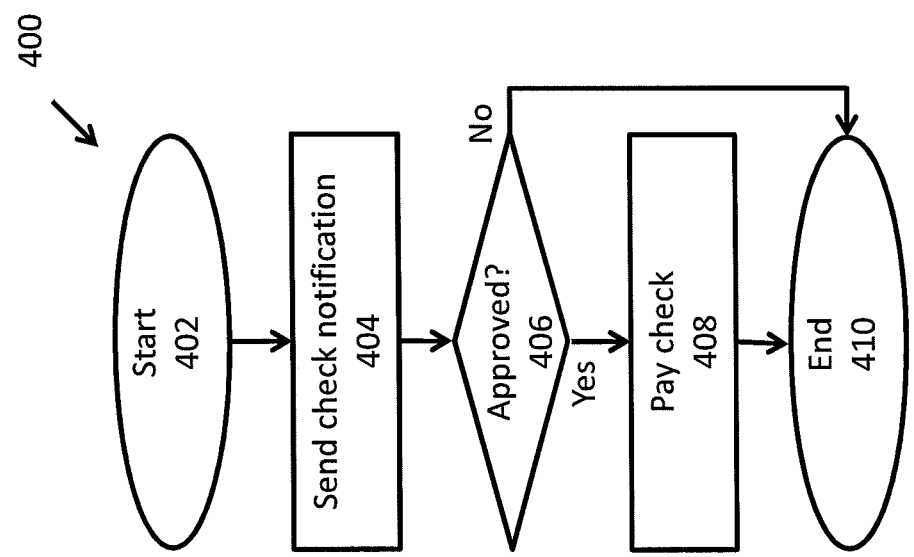

FIGS. 4A and 4B illustrate methodologies 400 and 450 related to notifications related to check deposits. Specifically, FIG. 4A illustrates methodology 400 for two way notification in check depositing. Methodology 400 begins at 402 and proceeds to 404 where a notification is sent to an account owner (or other authorized party) that a check from the account has been submitted for deposit. At 406, a determination is made as to whether this deposit was approved as received through feedback from the account owner. This can be done via an application or website, text message, voice message, et cetera. If the determination at 406 returns positive, methodology 400 proceeds to pay the check at 408. Thereafter, or if the determination at 406 returns negative, methodology 400 proceeds to end at 410.

FIG. 4B illustrates methodology 450 for a one way or two way notification scheme including a delay. Methodology 450 begins at 452 and proceeds to 454 where a notification is sent to an account owner (or other authorized person) indicating a check drawn on the account has been submitted for deposit (e.g., via RDC). At 456, a preplanned delay is imposed prior to depositing the check. In a two way embodiment, the pre-planned delay can serve as a response period for the user which times out if no response is received. In such embodiments, at 458, a determination is made as to whether, during the period, an indication to disallow depositing was received. If the determination at 458 returns negative (which can include, in alternative or complementary embodiments, the user either allowing the delay to expire in either one way or two way notification schemes, or expressly approving the payment in two way notification arrangements), methodology 450 proceeds to 460 where the check is paid. Methodology 450 thereafter ends at 462. If the determination at 458 returns positive, and the user has taken action to prevent payment of the check at 458, methodology 400 proceeds to 462 where the method ends without paying the check. In alternative embodiments, no delay may be imposed and the check deposited concurrently with or immediately after notification.

In embodiments, notifications can also be used to present users (e.g., clients or customers) with hold or availability information. For example, a notification can advise a user that, based on fraud analysis or other policies, a first amount will be available immediately and a second amount will be available after a time period. The notifications can explain why no funds will be made available, or how funds will be made available over time.

FIG. 5 illustrates an example methodology 500 for using sensor-based techniques to prevent fraudulent check deposits. Methodology 500 begins at 502 and proceeds to 504 where a sensor collected check information is received. This information can include an image or images and/or other sensor data (e.g., for determining a material of a check, an identity of a depositor, a location of a depositor, et cetera). At 506, the check information is analyzed and correspondence is determined based on features on the check as compared to related check features or known information stored in a database. Analysis and correspondence can be conducted at least as described elsewhere herein, including analysis for correspondence related to various check and account features, signatures, barcodes, et cetera. The correspondence is then used to calculate a check score at 508. At 510, a determination is made as to whether the check score violates a score threshold. If the check score does not violate the threshold and the determination at 510 returns negative, the check is paid at 512. If the determination at 510 returns positive, or after the check is paid at 512, methodology 500 ends at 514.

Figure 6:
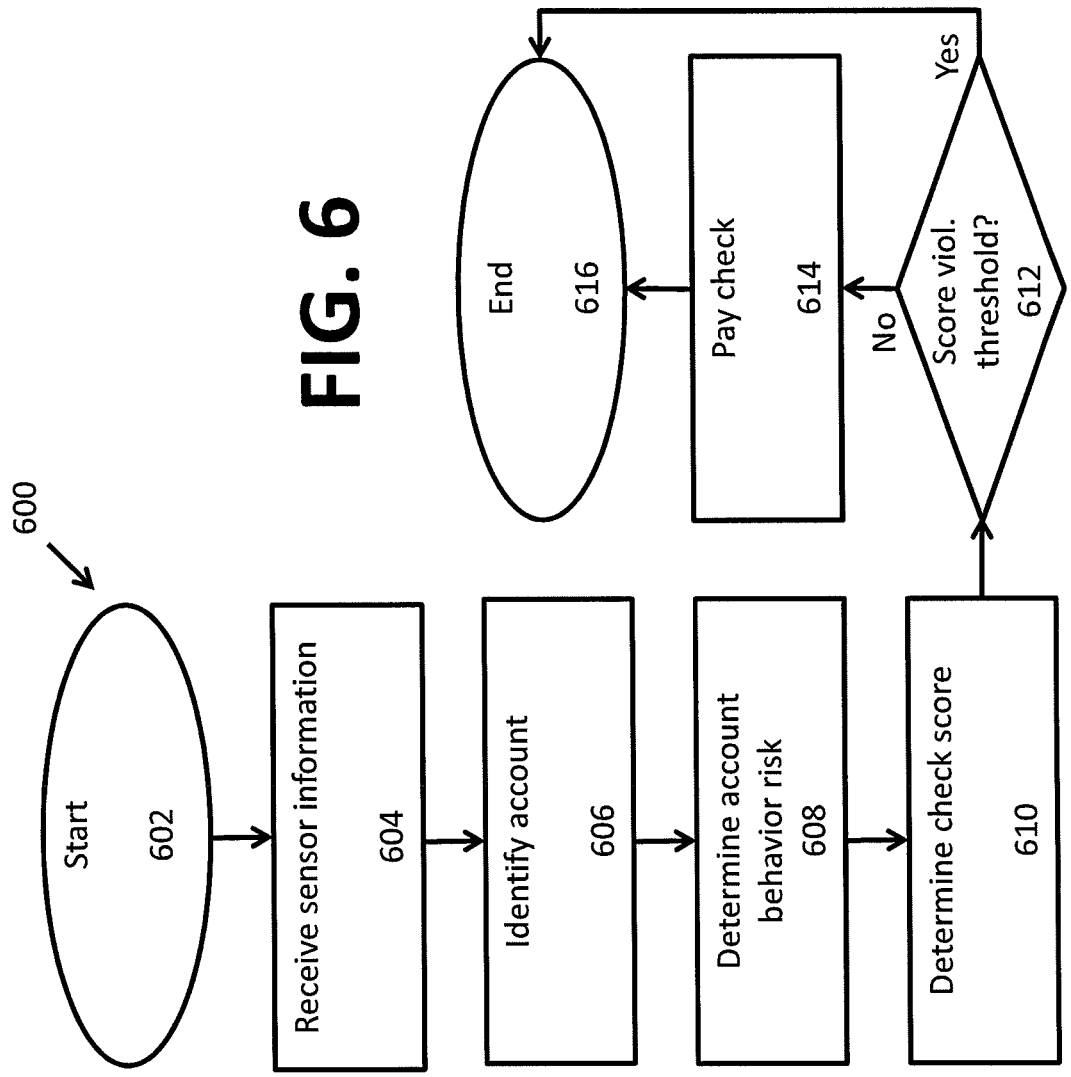
FIG. 6 illustrates a flow chart of an example method for using behavior analysis to determine risk related to a check image for deposit.

FIG. 6 illustrates a methodology 600 for using account behavior risk analysis to reduce check fraud. Methodology 600 begins at 602 and proceeds to 604 where check information is received from a sensor. The check information represents a check for deposit. At 606, an account (drawer or payee) associated with the transaction can be identified. Based on identification of the account, account behavior can be received and analyzed at 608 to determine an account behavior risk. Thereafter, at 610, a check score can be determined based on the account behavior risk. At 612, a determination is made as to whether the check score violates a score threshold. If the check score does not violate the threshold and the determination at 612 returns negative, the check is paid at 614. If the determination at 612 returns positive, or after the check is paid at 614, methodology 600 ends at 616.

Figure 7:
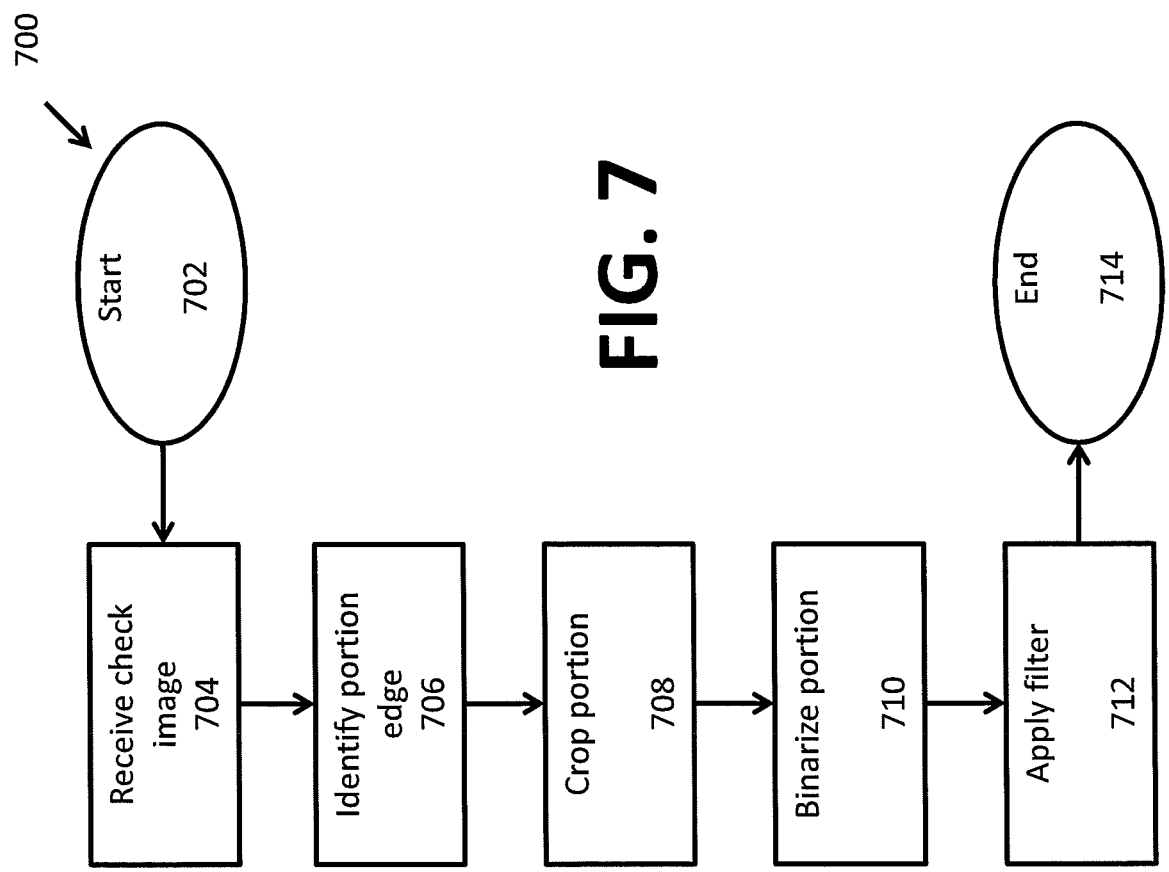
FIG. 7 illustrates a flow chart of an example method for processing a check image for deposit.

FIG. 7 illustrates a methodology 700 for processing sensor information such as a check image received via RDC. Methodology 700 starts at 702 and proceeds to 704 where a check image is received. Other sensor information can also be received. At 706, edges of at least a portion of a check—such as a feature for analysis—can be identified. At 708, the portion is cropped. In alternative embodiments, the portion need not be cropped but subsequent filters can be selected specific to the portion of interest. Other image processing such as de-skewing can also be performed here or at other times during the methodology. At 710, the portion is binarized, and thereafter at 712, a filter is applied to the binarized image. In embodiments, convolution based filtering can be employed. In embodiments, one or more filters can be selected based on detected lighting conditions. Thereafter, at 714, methodology 700 ends.

Figure 8:
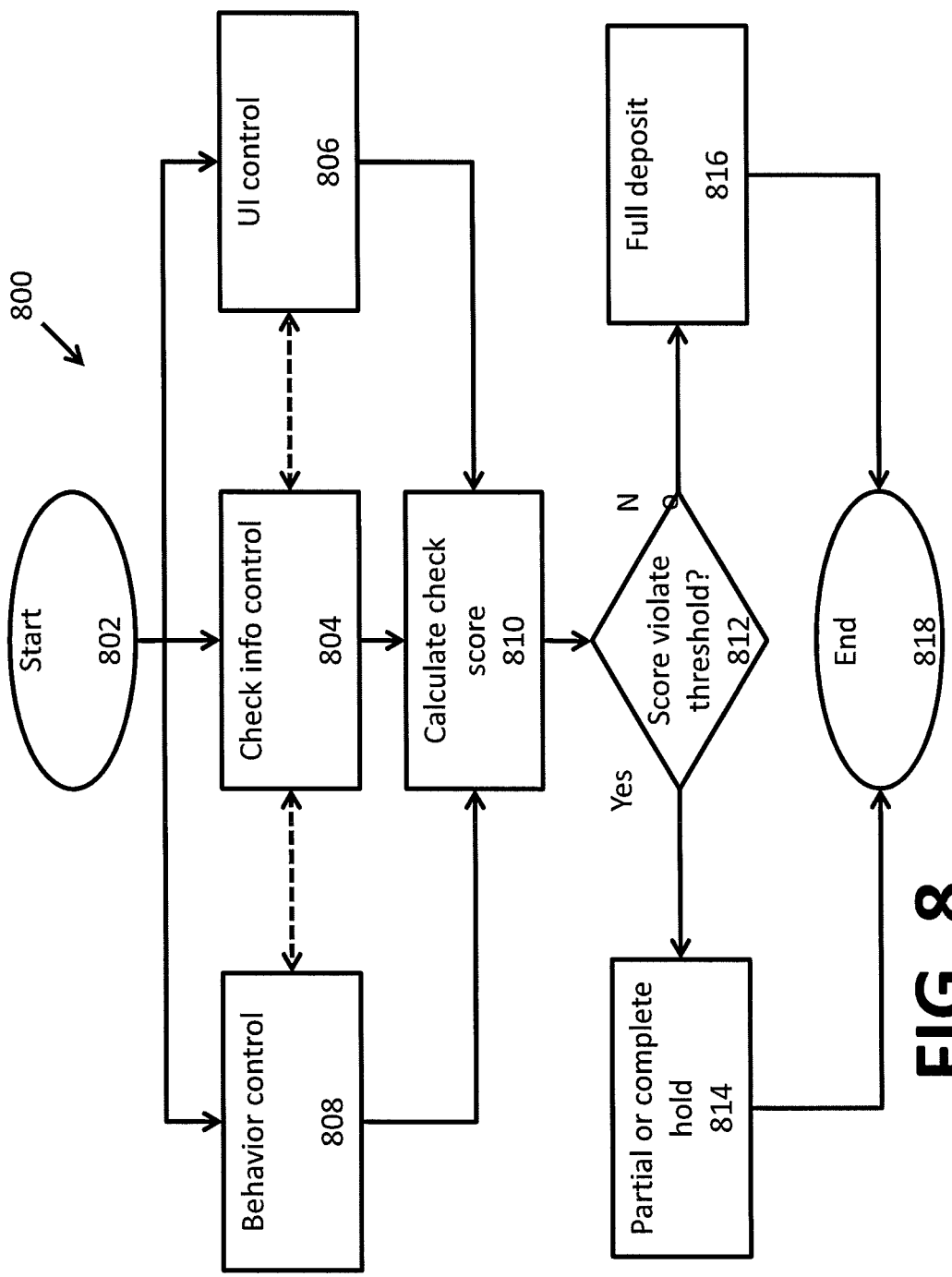
FIG. 8 depicts a flow chart of an example method for counterfeit check detection.

FIG. 8 illustrates a methodology 800 showing a multi-faceted approach to fraudulent check detection and handling. Methodology 800 starts at 802 after a check image is received (e.g., via RDC). At 804, 806, and 808, check information controls based on visual analysis, user interface controls (such as disable check writing preference and notification preference), and behavior analysis control can be completed successively or substantially simultaneously using check image information and account information related to the drawer and payee. Based on the information developed at 804, 806, and 808, a check score can be calculated. In embodiments, one or more of the aspects occurring at 804, 806, and 808 can also trigger a reject flag that automatically produces a violative check score (and the check score is thus determinative to rejection of the check) or causes automatic rejection of the check without scoring. In the latter case, an alternative method may proceed to 814 or 818.

Examples of behavior techniques can include member aggregate check withdrawal or deposit limits for all deposit channels. Similarly, funds transfer limits between accounts can be imposed on members or groups of members, relating to either number or total value of transfers. New account funding limits can also be imposed on checking, savings, and other accounts (or combinations thereof) to limit abuse of fund availability deadlines frequently preceding unauthorized returns. Limits can be placed on the number of accounts which may be open, or which may be opened in a particular period of time, per primary member or account identifier (e.g., social security number). These and other behavioral aspects can be evaluated for particular quantities or qualities influencing check score, or for purposes of triggering a reject flag or dispositive check score failure.

After the check score is calculated at 810, methodology 800 proceeds to 812 where a determination is made as to whether the check score violates one or more check score thresholds. If the check does not violate the threshold, the check can be deposited in full, or in accordance with check deposit procedures, at 816. If the check violates a threshold, depending on the threshold (or most serious threshold) violated, a partial or complete hold (or rejection) of the check can occur at 814. In a partial hold situation, a partial deposit may also be made at 814. A referral may also be made for further analysis or review where a partial or complete hold is placed on the funds associated with the check. Thereafter, at 818, methodology 800 ends.

While FIGS. 3A to 8 show various individual techniques or specific combinations thereof, any and all possible combinations, as well as combinations including other techniques discussed herein, are embraced under the scope of the disclosure. Various aspects can be weighted or influence check score or other activity in equal or unequal combinations. For example, machine vision techniques may be weighted to account for two thirds of the check score, with behavior techniques accounting for only one third, and user interface controls having determinative effect for rejection but otherwise not influencing check score. In an embodiment, a check score can be calculated or extracted based on any aspect described herein, including signature analysis, barcode analysis, check writing disablement, check sequence analysis, push notifications or responses thereto, et cetera.

Initial studies relating to the techniques herein suggest 80 to 90 percent of instance of check fraud using remote deposit capture can be prevented or mitigated through combined solutions leveraging multiple techniques above. Real-time techniques for fraud mitigation include barcode analysis, check sequence analysis, check writing disablement, signature analysis and verification, and duplicate detection and rejection. Behavioral or other analyses can also be performed in real-time and need not (or only minimally) delay check processing. Non-real-time techniques include the use of notifications. Estimates suggest at least 50% of on-us personal check fraud can be avoided, with the possibility of over 90% being prevented; over 40% of corporate check fraud can be avoided, with the possibility of over 90% being prevented; at least one third of treasury check fraud can be avoided, with the possibility of over 90% being prevented; and at least one quarter of all other check fraud being avoided, with the possibility of over 90% being prevented.

While aspects herein are discussed in terms of physical or paper checks, embodiments can also utilize digital checks or similar electronic instruments having value. Digital instruments can be interrogated in similar fashions, either as images or other data (e.g., textual, numerical, binary, or other information which images are converted into when processed or represented as in memory).

Further, aspects employing or similar to blockchain technology can be used in conjunction with these technologies. For example, an instrument can be written against a currency or other value stored in blockchain. Blockchain interrogation can determine the presence of the alleged value, and/or confirm transfer of the value (e.g., at multiple blockchain nodes) before making it available to an account.

Figure 9:
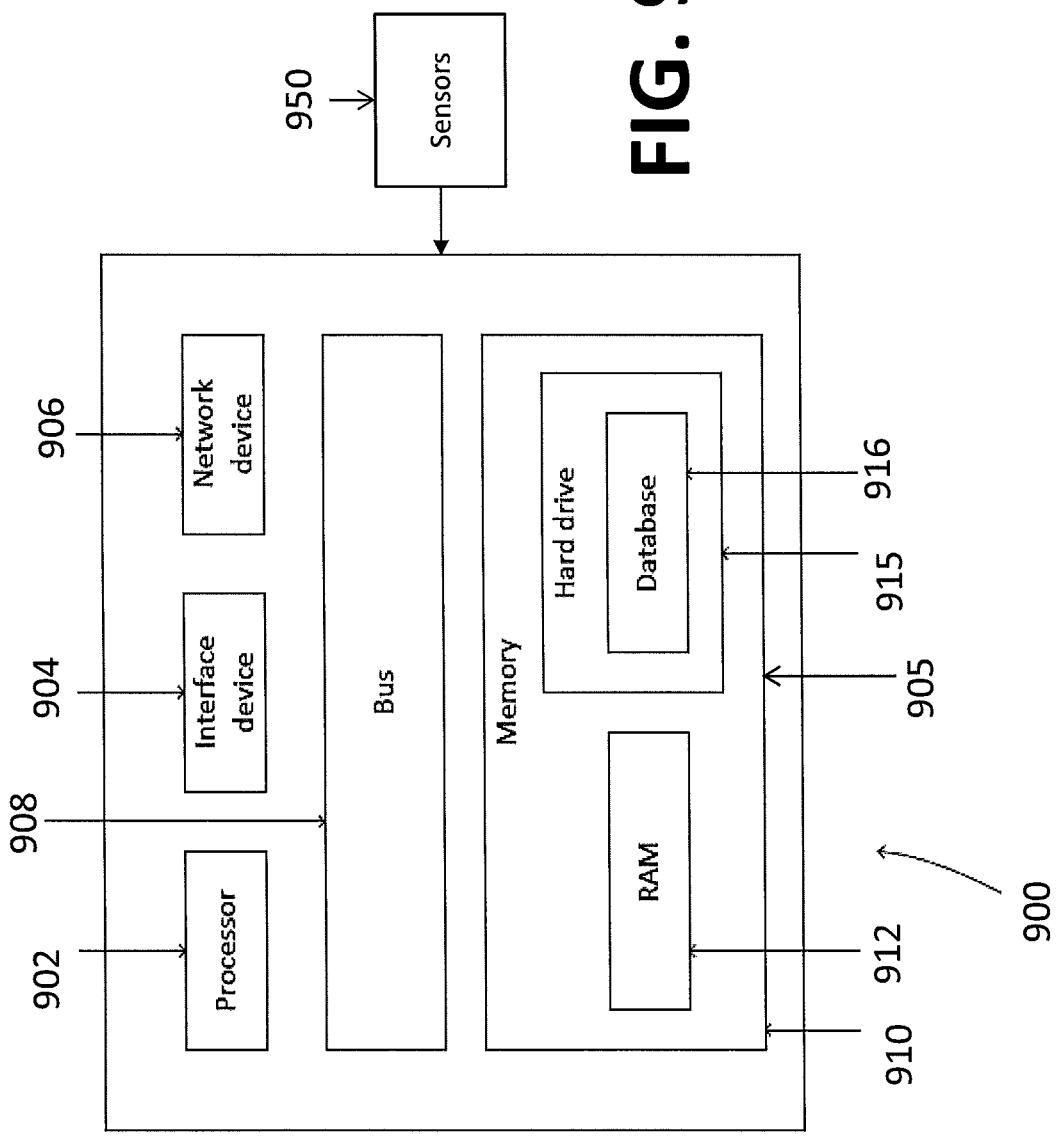
FIG. 9 depicts an exemplary computing device as might be utilized in coordination with the systems and methods described herein.

FIG. 9 illustrates an exemplary computing device 900 that may be used as part of the systems and methods described herein. Computing device 900 may include a memory 905, a processor 910, an interface device 915 (e.g., mouse, keyboard, monitor), and a network device 920. Memory 905 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network. In one example, memory 905 includes a series of computer instructions written in or implemented with any of a number of programming languages, as will be appreciated by those skilled in the art.

Memory 905 may include RAM 925, a hard drive 930, or a database 935. For example, database 935 may include or store information, such as information that relates to users, parties, or counterfeit detection system 200.

Sensors 950 can include, but are not limited to, visible light cameras, infrared cameras, specialized cameras employing particular lenses, filters, or other techniques, material or chemical sensors, microphones, et cetera.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 905 or separately in any of hardware (e.g., electronic circuitry), firmware, software, or a combination thereof. Engines/modules may contain instructions for controlling processor 910 to execute the methods described herein.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods have been described with respect to the examples disclosed above, those skilled in the art will readily appreciate that changes and modifications may be made thereto without departing from the spirit and scope of this disclosure.

What is claimed is:

1. A non-transitory computer-readable medium, comprising instructions, which when executed by a computer cause the computer to:
   receive a data transmission including at least a portion of a check image representing a check for deposit;
   analyze the portion of the check image to identify at least a first item of check information on a front or a back of the check image, a second item of check information on the front or back of the check image, and a check signature;
   analyze the first item of check information and the second item of check information, wherein analyzing the first item of check information identifies a financial institution associated with the check, wherein the financial institution utilizes a proprietary barcode format, and wherein analyzing the barcode includes comparing the barcode to the proprietary barcode format to determine a barcode correspondence;
   determine item correspondence between the first item of check information on the front or back of the check image and the second item of check information on the front or back of the check image;
   compare the check signature to an account signature to determine signature correspondence between the check signature and the account signature; and
   determine a check score based on the item correspondence and the signature correspondence.

2. The non-transitory computer-readable medium of claim 1, the instructions further causing the computer to:
   analyze the portion of the check image to identify a barcode;
   analyze the barcode to determine barcode correspondence between the barcode and barcode information; and
   determine the check score based the barcode correspondence.

3. The non-transitory computer-readable medium of claim 1, the instructions further causing the computer to:
   identify edges of at least the portion of the check;
   crop at least one feature within the portion of the check;
   binarize the at least one feature to produce a binarized image; and
   apply a filter to the binarized image for readability.

4. The non-transitory computer-readable medium of claim 3, wherein the filter is based on detected lighting conditions.

5. The non-transitory computer-readable medium of claim 1, the instructions further causing the computer to:
   analyze the portion of the check to identify a drawer of the check;
   receive behavioral data related to the drawer of the check;
   analyze the behavioral data related to the drawer of the check to determine a drawer behavior risk; and determine the check score based on the drawer behavior risk.

6. The non-transitory computer-readable medium of claim 1, the instructions further causing the computer to:
analyze the data transmission identify a payee of the check;
receive behavioral data related to the payee of the check;
analyze the behavioral data related to the payee of the check to determine a payee behavior risk; and
determine the check score based on the payee behavior risk.

7. The non-transitory computer-readable medium of claim 1, the instructions further causing the computer to:
analyze the portion of the check to identify an account associated with the check;
determine that check writing is disabled with respect to the account; and
reject the check for deposit based on check writing being disabled.

8. The non-transitory computer-readable medium of claim 1, the instructions further causing the computer to:
determine an account associated with the check;
identify an owner of the account; and
transmit a notification to the owner of the account alerting the owner of the check for deposit, wherein the notification requests a response from the owner.

9. The non-transitory computer-readable medium of claim 8, the instructions further causing the computer to:
receive the response from the owner, wherein the response is a negative response;
process a negative response to the notification; and
determine a check score based on the negative response, the check score is determinative to rejecting the check.

10. The non-transitory computer-readable medium of claim 1, the instructions further causing the computer to reject the check for deposit if the check score violates a score threshold.

11. The non-transitory computer-readable medium of claim 1, the instructions further causing the computer to hold at least a portion of funds associated with the check for deposit of the check score violates a score threshold.

12. The non-transitory computer-readable medium of claim 1, wherein the check score is further based on a correspondence between a routing number of the check and the financial institution.

13. The non-transitory computer-readable medium of claim 1, the instructions further causing the computer to:
compare a check design of the check to a known check design previously used by a drawer, wherein the first item of check information includes the check design, wherein the check score is further based on the check design and the known check design.

14. The non-transitory computer-readable medium of claim 1,
wherein analyzing the portion of the check to identify at least the first item of check information includes determining a check number from a corner of the check,
wherein analyzing the portion of the check to identify at least the second item of the check information includes determining a check number from an account number line of the check, and
wherein determining the item correspondence between the first item and the second item includes comparing the check number from a corner of the check to the check number from an account number line of the check.

15. A computer-implemented method comprising executing instructions stored on a non-transitory computer-readable medium, wherein when executed the instructions effectuate:
receiving a data transmission including at least a portion of a check image representing a check for deposit;
analyzing the portion of the check image to identify at least a first item of check information on a front or a back of the check image, a second item of check information on the front or back of the check image, and a check signature;
analyzing the first item of check information and the second item of check information, wherein analyzing the first item of check information identifies a financial institution associated with the check, wherein the financial institution utilizes a proprietary barcode format, and wherein analyzing the barcode includes comparing the barcode to the proprietary barcode format to determine a barcode correspondence;
determining item correspondence between the first item of check information on the front or back of the check image and the second item of check information on the front or back of the check image;
comparing the check signature to an account signature to determine signature correspondence between the check signature and the account signature; and
determining a check score based on the item correspondence and the signature correspondence.

16. The computer-implemented method of claim 15, further comprising:
identifying an owner of the account; and
transmitting a notification to the owner of the account alerting the owner of the check for deposit.

17. A system, comprising a non-transitory computer-readable medium storing instructions that when executed by a processor effectuate:
a communication module configured to receive a data transmission including at least a portion of a check image representing a check for deposit; and
a security module configured to:
analyze the portion of the check image to identify at least a first item of check information on a front or a back of the check image, a second item of check information on the front or back of the check image, and a check signature;
analyze the first item of check information and the second item of check information, wherein analyzing the first item of check information identifies a financial institution associated with the check, wherein the financial institution utilizes a proprietary barcode format, and wherein analyzing the barcode includes comparing the barcode to the proprietary barcode format to determine a barcode correspondence;
determine item correspondence between the first item of check information on the front or back of the check image and the second item of check information on the front or back of the check image;
compare the check signature to an account signature to determine signature correspondence between the check signature and the account signature; and
determine a check score based on the item correspondence and the signature correspondence.

18. The non-transitory computer-readable medium of claim 17, the instructions further causing the computer to:
analyze the portion of the check image to identify at least a first item of check information;

analyze the first item of check information to determine item correspondence between the first item of check information and a second item of check information; and determine a check score based on the item correspondence.

19. The non-transitory computer-readable medium of claim 17, the instructions further causing the computer to:

analyze the portion of the check to identify an account associated with the check;

determine that check writing is disabled with respect to the account; and reject the check for deposit based on check writing being disabled.

20. The non-transitory computer-readable medium of claim 17, wherein the check score is further based on a correspondence between a routing number of the check and the financial institution.

\* \* \* \* \*